(12) United States Patent
Cao et al.

(10) Patent No.: US 11,071,060 B2
(45) Date of Patent: Jul. 20, 2021

(54) SYSTEMS AND METHODS FOR WAKE-UP RADIO MULTI-ANTENNA TRANSMISSION

(71) Applicant: Marvell World Trade Ltd., St. Michael (BB)

(72) Inventors: Rui Cao, Fremont, CA (US); Hongyuan Zhang, Fremont, CA (US); Sudhir Srinivasa, Campbell, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 267 days.

(21) Appl. No.: 16/176,099

(22) Filed: Oct. 31, 2018

(65) Prior Publication Data
US 2019/0289547 A1    Sep. 19, 2019

Related U.S. Application Data

(60) Provisional application No. 62/643,577, filed on Mar. 15, 2018.

(51) Int. Cl.
*H04B 7/0413* (2017.01)
*H04W 52/02* (2009.01)
(Continued)

(52) U.S. Cl.
CPC .......... *H04W 52/0229* (2013.01); *H04B 7/04* (2013.01); *H04B 7/0413* (2013.01); *H04B 7/0617* (2013.01); *H04B 7/0697* (2013.01); *H04W 52/0235* (2013.01); *H04W 84/12* (2013.01)

(58) Field of Classification Search
CPC ...... H04B 7/04; H04B 7/0413; H04B 7/0617; H04B 7/0697; H04W 52/0229; H04W 52/0235; H04W 84/12; Y02D 30/70
See application file for complete search history.

(56) References Cited

U.S. PATENT DOCUMENTS

| | | | |
|---|---|---|---|
| 2010/0216523 A1* | 8/2010 | Sebastiano | H04W 52/0229 455/574 |
| 2011/0026639 A1 | 2/2011 | Rouquette-Leveil et al. | |

(Continued)

OTHER PUBLICATIONS

Cao et al, "Discussion on WUR Multi-Antenna Transmission", IEEE 802.11-18/0413r2, 17 pgs., Mar. 5, 2018.

(Continued)

*Primary Examiner* — Melvin C Marcelo
*Assistant Examiner* — Natali Pascual Peguero

(57) ABSTRACT

Embodiments described herein provide a method for transmitting a wake-up radio packet to low power devices in a wireless local area network. At a wireless access point having a plurality of antennas, data for transmission to one or more lower power wireless devices are received. A wake-up radio packet, including a wake-up data frame, is configured for transmission to the one or more lower power wireless devices. A waveform for transmitting the wake-up radio packet is generated. At each of the plurality of antennas, the waveform is adjusted with spatial mapping to prevent unintentional spatial nulling of the waveform during transmission of the wake-up radio packet. The wake-up radio packet is transmitted, via the plurality of antennas, in a form of the adjusted waveform to the one or more lower power wireless devices prior to transmitting the received data to the one or more lower power wireless devices.

20 Claims, 3 Drawing Sheets

(51) Int. Cl.
H04B 7/06 (2006.01)
H04B 7/04 (2017.01)
H04W 84/12 (2009.01)

(56) References Cited

U.S. PATENT DOCUMENTS

2012/0087436 A1* 4/2012 Srinivasa .............. H04L 1/0059
375/295
2012/0120859 A1* 5/2012 Stephens ........... H04W 52/0229
370/311

OTHER PUBLICATIONS

International Search Report and Written Opinion for International Application No. PCT/US2018/058410 dated Jan. 16, 2019.
Kristem et al., "WUR performance study with multiple TX antennas", IEEE 802.11-18/0493r0, 15 pgs., Mar. 3, 2018.
Sundman et al., Omni-directional Multiple Antenna Transmission for WUS, IEEE 802.11-18/0144r2, 5 pgs., Jan. 14, 2018.

* cited by examiner

| Antenna Index | | | | | | | | | |
|---|---|---|---|---|---|---|---|---|---|
| | 1 | 2 | 3 | 4 | 5 | 6 | 7 | 8 | >8 |
| 1 | 0 | | | | | | | | |
| 2 | 0 | -1000 | | | | | | | |
| 3 | 0 | -500 | -1000 | | | | | | |
| 4 | 0 | -250 | -500 | -750 | | | | | |
| 5 | 0 | -875 | -125 | -250 | -375 | | | | |
| 6 | 0 | -1000 | -125 | -750 | -875 | -625 | | | |
| 7 | 0 | -1000 | -750 | -125 | -875 | -375 | -250 | | |
| 8 | 0 | -875 | -750 | -625 | -125 | -500 | -250 | -1000 | |
| >8 | 0 | -875 | -750 | -625 | -125 | -500 | -250 | -1000 | [-1000~0] |

SYSTEMS AND METHODS FOR WAKE-UP RADIO MULTI-ANTENNA TRANSMISSION

CROSS-REFERENCE TO RELATED APPLICATION

This disclosure claims the benefit under 35 U.S.C. § 119(e) of U.S. Provisional Patent Application No. 62/643,577, filed on Mar. 15, 2018, which is hereby incorporated by reference herein in its entirety.

FIELD OF USE

This disclosure relates to managing low power devices in a wireless communication system, and specifically, to transmitting a wake-up request (WUR) frame via multiple antennas to low power devices in a wireless communication system.

BACKGROUND OF THE DISCLOSURES

The background description provided herein is for the purpose of generally presenting the context of the disclosure. Work of the inventors hereof, to the extent the work is described in this background section, as well as aspects of the description that does not otherwise qualify as prior art at the time of filing, are neither expressly nor impliedly admitted to be prior art against the present disclosure.

In existing systems, a wireless local area network (WLAN) is usually used in an environment to interconnect a group of user devices, such as the Internet of Things (IoT) devices. For example, in a home environment, devices such as a thermostat, a laptop computer, a smart phone, a television set-top box, and/or the like, can be interconnected under the home WLAN. Such user devices are often low power Wi-Fi devices, which includes a low power wake-up receiver used as a companion radio receiver with an 802.11 WLAN receiver, which is used to serve as a WUR signal receiver, while the 802.11 WLAN receiver is used to receive payload user data after the WUR signal is received. The low power device may transit into a sleep mode by turning off the Wi-Fi module to save power, when the device is not in use. Specifically, a low power device may constantly turn off its Wi-Fi module to save power when the low power device is not in use. To maintain the connection between the access point (AP) and the low power device, duty-cycle protocols are sometimes defined to synchronize the access point and the low power device, so that the access point is configured to wake up the low power device at each duty-cycled operation. However, with duty-cycled operations, low power consumption and low latency can sometimes be conflicting qualities. For example, to increase batter life, the low power device attempts to sleep more, which may increase latency when the low power device needs to be awaken back to an operational mode. On the other hand, to receive data with low latency, the low power device may need to constantly "wake up," which reduces the battery life.

To maintain the connection between an access point and a low power device of the WLAN, for example, the access point may need to transmit a wake-up request (WUR) signal to "wake up" the low power device, e.g., a thermostat, such that the thermostat is notified and thus prepared to receive data packets of configuration data on the regular Wi-Fi from the access point. A WUR mechanism is proposed in the 802.11 standard to support low power operations to turn on the 802.11 main radio to receive data packet transmission. The transmitter at the access point normally deploys multiple antennas, but WUR receivers at a low power device usually uses a single antenna. Existing standards do not define the multi-antenna modulation and transmission format for a WUR packet.

SUMMARY

Embodiments described herein provide a method for transmitting a wake-up radio packet to low power devices in a wireless local area network. At a wireless access point having a plurality of antennas, data for transmission to one or more lower power wireless devices are received. A wake-up radio packet, including a wake-up data frame, is configured for transmission to the one or more lower power wireless devices. A waveform for transmitting the wake-up radio packet is generated. At each of the plurality of antennas, the waveform is adjusted with spatial mapping to prevent unintentional spatial nulling of the waveform during transmission of the wake-up radio packet. The wake-up radio packet is transmitted, via the plurality of antennas, in a form of the adjusted waveform to the one or more lower power wireless devices prior to transmitting the received data to the one or more lower power wireless devices.

In some implementations, the waveform is adjusted with spatial mapping, by each of the plurality of antennas, to prevent unintentional spatial nulling of the waveform during the transmission of the wake-up radio packet by applying a different phase rotation pattern to the respective waveform corresponding to the respective antenna by multiplying, at each tone of a plurality of tones in a frequency domain, a respective spatial mapping vector corresponding to the respective tone with content loaded on the respective tone. The respective results corresponding to a set of center tones of the plurality of tones is added to obtain a transmitted signal vector.

In some implementations, each element of the respective spatial mapping vector is calculated based on a cyclic shift diversity value corresponding to a respective antenna.

In some implementations, each element of the respective spatial mapping vector is calculated based on a random phase variable for each antenna on the respective tone. The random phase variable is generated according to a probability distribution.

In some implementations, the waveform is adjusted with spatial mapping, by each of the plurality of antennas, to prevent unintentional spatial nulling of the waveform during the transmission of the wake-up radio packet by applying, at each of the plurality of antennas, a different frequency shift to the respective waveform corresponding to the respective antenna by summing content loaded at each tone of a plurality of tones in a frequency domain for a set of center tones of the plurality of tones. A spatial mapping vector is multiplied with summed contents to obtain a transmitted signal vector.

In some implementations, each element of the spatial mapping vector is configured based on a fixed frequency shift variable.

In some implementations, each element of the spatial mapping vector is configured based on a random frequency shift variable, and wherein the random frequency shift variable is generated following a probability distribution.

In some implementations, the waveform is adjusted with spatial mapping, by each of the plurality of antennas, to prevent unintentional spatial nulling of the waveform during the transmission of the wake-up radio packet by generating a transmitted signal vector by summing content vectors corresponding to a set of center tones of a plurality of tones in a frequency domain.

In some implementations, for each content vector, at least one of content loaded to each antenna of the plurality of antennas and interleaving or scrambling pattern used for each antenna of the plurality of antennas is different per each antenna.

In some implementations, the waveform is adjusted with spatial mapping, by each of the plurality of antennas, to prevent unintentional spatial nulling of the waveform during the transmission of the wake-up radio packet by applying, at each antenna of the plurality of antennas, a cyclic shift diversity value to the waveform. The cyclic shift diversity value is determined based on a pre-defined cyclic shift diversity value defined in 802.11ac standard.

Embodiments described herein provide a network device for transmitting a wake-up radio packet to low power devices in a wireless local area network. The network device includes processing circuitry configured to receive data for transmission to one or more lower power wireless devices. The processing circuitry is further configured to configure a wake-up radio packet including a wake-up data frame for transmission to the one or more lower power wireless devices. The processing circuitry is further configured to generate a waveform for transmitting the wake-up radio packet. The network device further includes a plurality of antennas configured to adjust, at each of the plurality of antennas, the waveform with spatial mapping to prevent unintentional spatial nulling of the waveform during transmission of the wake-up radio packet. The plurality of antennas is further configured to transmit the wake-up radio packet in a form of the adjusted waveform to the one or more lower power wireless devices prior to transmitting the received data to the one or more lower power wireless devices.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems for multi-antenna transmission of wake-up request (WUR) frames via spatial mapping.

In a WLAN system including at least one access point and a low power device that includes a low power WUR receiver and an 802.11 receiver, the transceiver of the access point usually deploys multiple antennas, while the WUR receiver at the low power device is more likely to be operated with a single antenna. In addition, the WUR frames usually adopt an on-off keying (OOK) waveform design, which needs to be designed to avoid unintentional spatial nulling. In view of this problem, embodiments described herein provide a specific format for a WUR frame and waveform design for multi-antenna transmission of the WUR frame.

Figures 1, 2:
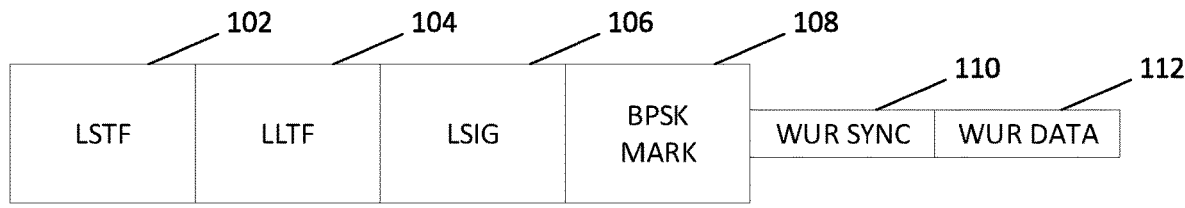
FIG. 1 is a block diagram illustrating an example WUR frame, according to some embodiments described herein.
FIG. 2 is a table illustrating example time and/or phase offsets that may be applied to a waveform for a WUR frame transmission, according to some embodiments described herein.

FIG. 1 is a block diagram illustrating an example WUR frame, according to some embodiments described herein. A WUR packet may include three parts, a legacy 20 MHz portion (including 102, 104, 106 and 108), a WUR synchronization portion 110 and a WUR data portion 112. Specifically, the legacy preamble (transmitted on a bandwidth of 20 MHz) includes a legacy short training field (LSTF) 102, a legacy long training field (LLTF) 104, a legacy signal field (LSIG) 106, and a binary phase-shift keying (BPSK) mark 108. The WUR synchronization portion 110 is modulated to a narrow-band (e.g. 4 MHz) waveform that serves the purpose of WUR sensing and synchronization timing. The WUR data portion 112 is modulated to a narrow-band (e.g. 4 MHz) waveform that carries the WUR payload.

The WUR legacy preamble portion (102-108) can be used to spoof an 802.11 main radio to correctly set the clear channel assessment (CCA) in the physical layer. For example, the BPSK mark 108 is inserted after the LSIG field 106 to avoid false detection of the WUR packet as an 802.11 data frame. Further description of using the BPSK mark to spoof an 802.11n device may be found in commonly-assigned and co-pending U.S. application Ser. No. 16/141,103, filed Sep. 25, 2018, which is hereby expressly incorporated by reference herein in its entirety.

In an 802.11n/ac/ax multiple-input multiple-output (MIMO) system, cyclic shift diversity (CSD) is designed to avoid unintentional spatial nulling to the receiver. When multiple antennas at the access point are used for WUR packet transmission, the legacy preamble portion (102-108) may use the same per-antenna CSD as defined in 802.11ac/ax.

The WUR synchronization portion 110 and the WUR data portion 112 use OOK modulation, with single stream information transmitted under OOK. For example, the WUR waveform, represented by w[n], can be defined in the frequency domain using legacy 802.11 orthogonal frequency-division multiplexing (OFDM) numerology, e.g., only populating the center 13 tones of the total 64 tones, which may be calculated in a similar way to the following:

$$w[n]=\Sigma_{k=-K}^{K}e^{-jn \cdot k/64}X[k],$$

where w[n] represents the WUR signal at a discrete time instance n; X[k] is the wave form value on tone k, and when K=6, only the center 13 tones are populated.

A spatial mapping design of the WUR synchronization portion 110 and the WUR data portion 112 may be adopted. Specifically, when channel information is available at the access point, spatial nulling (beamforming) can be performed. As explicit channel sounding is not defined in the WUR frame, spatial nulling may not be available for all WUR transmitters. Different statistical spatial mapping design may be used to avoid unintentional spatial nulling. For example, each antenna at the access point can apply different adjustment to the waveform, so that the WUR receiver at a low power device may observe a different but equivalent channel from the receiving antenna. For example, the WUR signal transmitted on the ith antenna can be calculated as follows:

$$w_i[n]=\Sigma_{k=-K}^{K}e^{-jn \cdot k/64}Q_{i,n,k}X_i[k],$$

where $w_i[n]$ denotes the WUR signal transmitted on antenna i at a discrete time instance n; $Q_{i,n,k}$ denotes the spatial adjustment value to antenna i and on tone k, which is applied to the WUR signal sample at time instance n; $X_i[k]$ denotes the content loaded on tone k for antenna i.

Various techniques may be applied at the transmitter antenna at the access point to avoid unintentional spatial nulling, including per-antenna phase rotation, per-antenna frequency shift, per-antenna content variation, and/or the like. The transmitter at the access point may either be forced to apply standardized per-antenna adjustment, or may have the freedom to choose its own per-antenna adjustment based on its deployment environment and hardware configurations.

In some embodiments, the access point may apply per-antenna phase rotation to avoid unintentional spatial nulling. For example, each antenna at the access point transmitter is configured to apply a different phase rotation pattern to the waveform, so that the WUR receiver at the low power device observes a different equivalent channel from each antenna. The WUR signal transmitted in this way is then calculated as:

$$\underline{w}[n] = \sum_{k=-N}^{N} e^{-j \cdot n \cdot k / 64} Q_k X[k],$$

where $\underline{w}[n]$ denotes the transmitted WUR signal vector (of all transmitter antennas) at a discrete time instance n; $Q_k$ is an M×1 spatial mapping vector of spatial adjustment values to each antenna, and M denotes the number of antennas at the access point; and X[k] denotes the wave form value on tone k. In this way, as the WUR receiver at the low power device, usually a single antenna, observes a different channel for WUR signal transmission from a different transmitter antenna at the access point, unintended spatial nulling may be avoided.

In some embodiments, the per-antenna phase rotation may be implemented through linear phase roll. For example, similar to 802.11n/ac/ax CSD, each antenna at the access point is configured to apply a different linear phase roll to each loaded tone, e.g., the spatial mapping vector $Q_k$ may be defined as:

$$Q_k = [e^{-j \cdot t_{CSD}^0 \cdot k/64}; e^{-j \cdot t_{CSD}^1 \cdot k/64}, \ldots, e^{-j \cdot t_{CSD}^{M-1} \cdot k/64}],$$

where $t_{CSD}^i$ denotes the CSD value for antenna i at the access point. Specifically, larger CSD values can be chosen for WUR to achieve good diversity for smaller WUR signal bandwidth. The per-antenna phase rotation may also be implemented in the time domain by circularly shifting the OOK waveform in time by an amount equivalent to $t_{CSD}^i$ for antenna i.

In some embodiments, the per-antenna phase rotation may be implemented through random phase perturbation. For example, each antenna at the access point is configured to apply a random small phase perturbation. The random phase perturbation may be generated according to a certain distribution, e.g., a normal distribution or a uniform distribution. The random phase may be applied per tone in the frequency domain, e.g., the corresponding spatial mapping vector $Q_k$ may be defined as:

$$Q_k = [e^{-j \cdot \theta_k^0 / 64}; e^{-j \cdot \theta_k^1 / 64}, \ldots, e^{-j \cdot \theta_k^{M-1}/64}], \text{ or}$$

where $\theta_k^i$ denotes the random phase for the antenna i on the kth tone. Alternatively, the random phase can also be applied per sample in the time domain to each WUR signal sample, e.g., the corresponding spatial mapping vector $Q_k$ may be defined as:

$$Q_n = [e^{-j \cdot \theta_n^0 / 64}; e^{-j \cdot \theta_n^1 / 64}, \ldots, e^{-j \cdot \theta_n^{M-1}/64}]$$

where $\theta_n^i$ denotes the random phase for the antenna i at the discrete time instance n.

In some embodiments, the access point is configured to implement per-antenna frequency shift to avoid unintentional spatial nulling. For example, when OOK design is applied for the WUR signal, which leads to relatively low sensitivity to phase noise, a frequency shift may be added to the WUR signal at each antenna to combat unintentional spatial nulling, as calculated below:

$$\underline{w}[n] = Q_{[n]} \sum_{k=-K}^{N} e^{-j \cdot n \cdot k / 64} X[k],$$

where $\underline{w}[n]$ denotes the transmitted signal vector at a discrete time instance n across all antennas at the access point; $Q_{[n]}$ represents the M×1 spatial mapping vector as defined above; and M is the number of antennas at the transmitter. Specifically, $Q_{[n]}$ may be designed with a fixed frequency shift pattern $\Delta f = [\Delta f_0, \Delta f_1, \ldots, \Delta f_{M-1}]$, which leads to:

$$Q_{[n]} = \left[e^{-j \cdot \Delta f_0 \cdot n/64}; e^{-j \cdot \Delta f_1 \cdot n/64}, \ldots; e^{-j \cdot \Delta f_{M-1} \cdot \frac{n}{64}}\right].$$

Alternatively, the frequency shift may be implemented with random frequency perturbation. For example, a random small frequency perturbation $\Delta f_i$ may be applied to each antenna i at the transmitter, in the form of $Q_{[n]}$ vector described above. Each random frequency shift $\Delta f_i$ may be generated following a certain probability distribution, for example, a normal distribution, a uniform distribution, and/or the like.

In some embodiments, the access point is configured to implement per-antenna content variation to avoid unintentional spatial nulling. For example, for each antenna at the transmitter, different content may be loaded on each frequency tone, e.g., the transmitted signal vector $\underline{w}[n]$ is calculated as:

$$\underline{w}[n] = \sum_{k=-K}^{K} e^{-j \cdot n \cdot k/64} X[k]$$

where X[k] is an M×1 content vector for the frequency tone k, and M is the number of antennas at the transmitter. Specifically, when k=6 and the 13 center tones are chosen to load content, different 13-tone content may be defined for each antenna. Or alternatively, the same 13-tone content may be used for different antennas, but a different interleaving or scrambling pattern may be used for each antenna.

FIG. 2 is an example table illustrating example time and/or phase offsets that may be applied to a waveform design for WUR multi-antenna transmission, according to some embodiments described herein. WUR multi-antenna transmission may be designed with CSD, as CSD is defined in 802.11ac. However, greater CSD values than those adopted by 802.11ac may be applied to WUR signals to accommodate a smaller signal bandwidth (e.g., 4 MHz to transmit the WUR synchronization portion 110 and WUR data portion 112), and receiver sampling rate, e.g., also at 4 MHz. The WUR CSD may be designed with a minimum CSD shift amount of 250 ns or 125 ns. For example, the WUR CSD values may be chosen to be N (e.g., N=4, 5, 6, 7, etc.) times of CSD values of the pre-VHT portion defined in 802.11ac. Table 200 in FIG. 2 shows the example CSD values selected as 5 times of the CSD values defined in 802.11ac for each antenna at a multi-antenna transmitter of the access point. The horizontal axis of table 200 represents the antenna index of the multi-antenna transmitter, and the vertical axis represents the total number of antennas of the multi-antenna transmitter (e.g., ranging from a single antenna, to more than 8 antennas).

In another example, the per-stream CSD values for a VHT portion defined in 802.11ac may be used as the per-antenna CSD value for WUR transmission.

In some embodiments, the WUR multi-antenna transmission may be designed with different waveforms for different antennas. As a WUR receiver is configured to detect a WUR signal via non-coherent detection, transmission energy is critical to the performance of WUR transmission. Different waveforms may be used for transmitting the WUR signal via different transmitter antennas as long as each waveform is transmitted using the same energy. In this way, as different waveforms are used to transmit the WUR signal on different antennas, unintentional spatial nulling can be avoided. For example, when the WUR signal is transmitted via an OOK waveform, for each "ON" bit received, the received waveform may be written as:

$$\underline{y} = \sum_{i=0}^{N_{tx}-1} w_i[n] \otimes h_i[n]$$

where $w_i[n]$ denotes the waveform on antenna i at the discrete time instance n; $h_i[n]$ denotes the channel between the antenna i and the receiver antenna at the low power device; and $\underline{y}$ denotes the received waveform. For each antenna i, $w_i[n]$ may be designed with a different phase from other antennas.

In some embodiments, the waveform design for the multi-antenna WUR transmission may combine one or more techniques described above, including but not limited to per-antenna phase rotation, per-antenna frequency shift, per-antenna content variation, CSD designs, and/or the like. For example, a base waveform may be designed for the WUR signal, e.g., OOK waveform, and CSD values (as described in FIG. 2) may be added to the base waveform. In addition, random phase or frequency shift may be applied to the WUR vector $\underline{w}[n]$ with different frequency or phase shifts across antennas.

Figure 3:
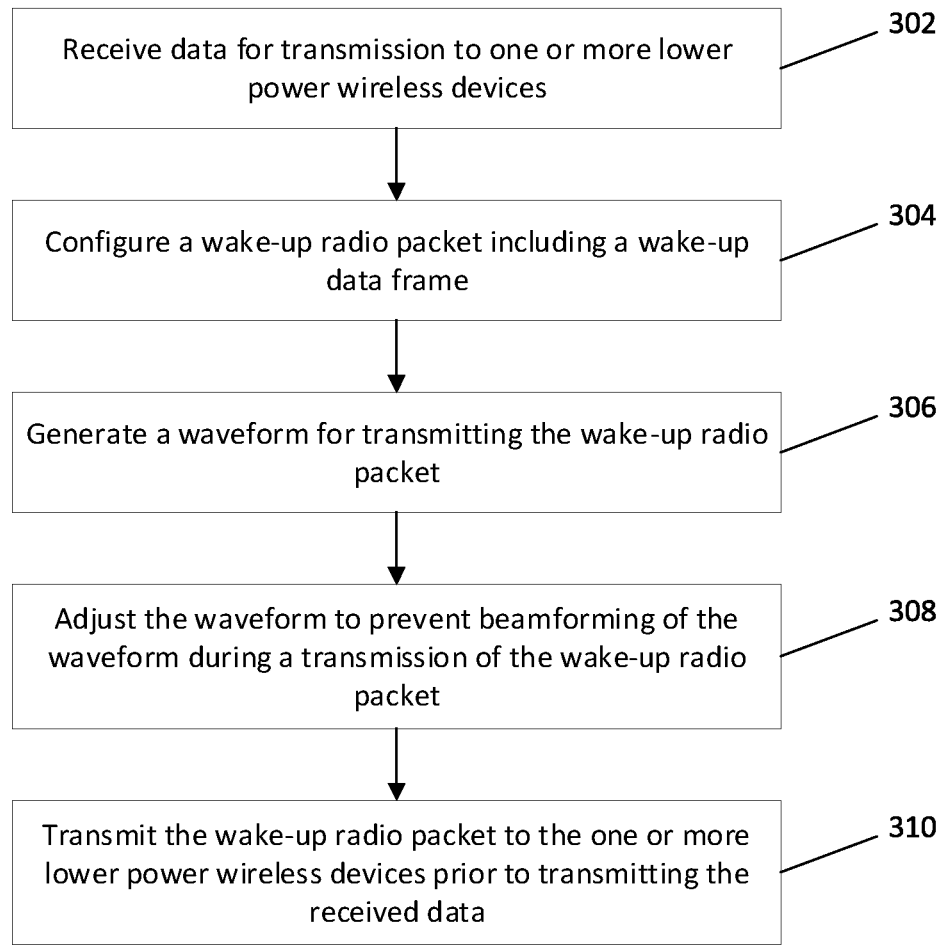
FIG. 3 shows an example logic diagram illustrating a wireless access point configuring and transmitting a WUR frame (similar to those described in FIG. 1) to wake up one or more low power devices prior to transmitting payload data, according to embodiments described herein.

FIG. 3 shows an example logic flow diagram illustrating a process implemented by a wireless access point to configure, modulate, and transmit a WUR frame (similar to the frame shown in FIG. 1), according to embodiments described herein. The process shown in FIG. 3 may be implemented at a wireless communication device (405 in FIG. 4) that is operated in compliance with the 802.11 standard, e.g., 802.11ax, 802.11az, etc.

At 302, the wireless access point is configured to receive data, e.g., from a host system, for transmission to one or more low power wireless devices in the same WLAN of the access point. At 304, the access point configures a WUR packet that includes a WUR frame, e.g., including fields 102-112 as shown in FIG. 1. At 306, a waveform is generated (e.g., OOK) for transmitting the WUR packet. At 308, the generated waveform is adjusted to prevent spatial nulling of the waveform during the transmission via multiple antennas. For example, as described in relation to FIGS. 1-2, various techniques such as per-antenna phase rotation, per-antenna frequency shift, per-antenna content variation, CSD designs, and/or the like may be applied separately or combinationally. At 310, the WUR packet may be transmitted to the lower power device through the multiple antennas using the adjusted waveforms.

Figure 4:
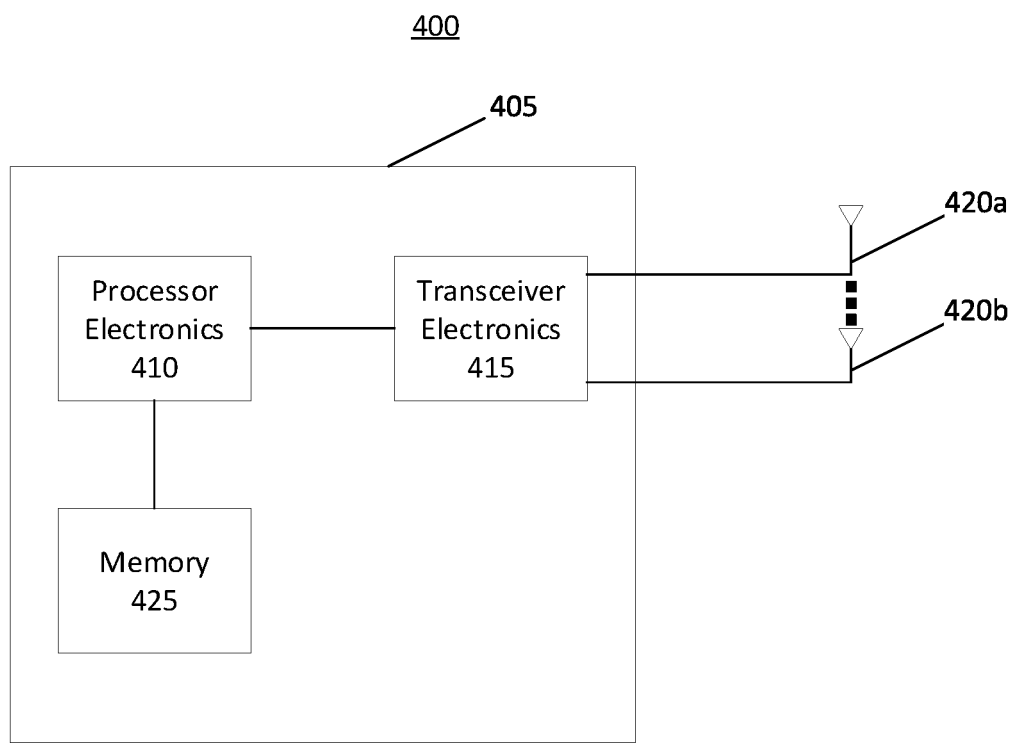
FIG. 4 shows a simplified block diagram of an example of a wireless communication device configured to implement the process described in FIG. 3, according to embodiments described herein.

FIG. 4 shows a simplified block diagram of an example of a wireless communication device configured to implement the process described in FIG. 3, according to embodiments described herein. Various examples of device 405 include an access point, a base station (BS), a client device, an access terminal (AT), a client station, or a mobile station (MS), and/or the like. For example, the device 405 can represent the access point or the low power device discussed throughout FIGS. 1-3.

The device 405 can include processor electronics 410 such as one or more processors that implement methods effecting the techniques presented in this disclosure. The processor electronics 410 can be operable to execute computer-readable instructions that, when executed on the processor electronics 410, cause the device 405 to implement methods (e.g., shown in FIG. 3) effecting the techniques presented in this disclosure. For example, the processor electronics 410 can decode a received uplink A-MPDU to determine whether a client station supports duplex transmission, or to identify a legacy PHY SIG or 802.11 PHY ISIG from the uplink A-MPDU.

The device 405 can include transceiver electronics 415 (e.g., a transmitter, receiver, or transceiver) to send and/or receive wireless signals over one or more antennas 420a-420b. In some embodiments, transceiver electronics 415 can include multiple radio units. In some embodiments, a radio unit includes a baseband unit (BBU) and a radio frequency unit (RFU) to transmit and receive signals. In some embodiments, the device 405 includes dedicated circuitry for transmitting (e.g., a dedicated transmitter) and dedicated circuitry for receiving (e.g., a dedicated receiver). For example, transceiver electronics 415 can include one or more receivers that receive one or more signals from one or more antennas 420a-420b, transmitted over one or more WLAN channels. The transceiver antennas 420a-b and the transceiver electronics 415 are configured to The device 405 can include one or more memories 425 configured to store information such as data and/or instructions (e.g., computer-readable instructions that cause the device 405 to implement methods effecting the techniques presented in this disclosure.

Various embodiments discussed in conjunction with FIGS. 1-4 are performed by various electronic components of one or more electronic circuits, such as but not limited to an integrated circuit, application-specific integrated circuit (ASIC), DSP, and/or the like. Various components discussed throughout this disclosure such as, but not limited to network devices (e.g., wireless access point, low power devices discussed in relation to FIGS. 1-4), and/or the like, are configured to include a set of electronic circuit components, and communicatively operate on one or more electronic circuits. Each electronic circuit is configured to include any of, but not limited to logic gates, memory cells, amplifiers, filters, and/or the like. Various embodiments and components disclosed herein are configured to be at least partially operated and/or implemented by processor-executable instructions stored on one or more transitory or non-transitory processor-readable media.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

The subject matter of this specification has been described in terms of particular aspects, but other aspects can be implemented and are within the scope of the following claims. For example, the actions recited in the claims can be performed in a different order and still achieve desirable results. As one example, the process depicted in FIG. 3 does not necessarily require the particular order shown, or sequential order, to achieve desirable results. In certain implementations, multitasking and parallel processing may be advantageous. Other variations are within the scope of the following claims.

What is claimed is:

1. A method for transmitting a wake-up radio packet to low power devices in a wireless local area network, the method comprising:
    receiving, at a wireless access point having a plurality of antennas, data for transmission to one or more lower power wireless devices;
    configuring a wake-up radio packet including a wake-up data frame for transmission to the one or more lower power wireless devices;
    generating a waveform for transmitting the wake-up radio packet;
    adjusting, at each of the plurality of antennas, the waveform with spatial mapping to prevent unintentional spatial nulling of the waveform during transmission of the wake-up radio packet; and
    transmitting, via the plurality of antennas, the wake-up radio packet in a form of the adjusted waveform to the one or more lower power wireless devices prior to transmitting the received data to the one or more lower power wireless devices.

2. The method of claim 1, wherein the adjusting, by each of the plurality of antennas, the waveform with spatial mapping to prevent unintentional spatial nulling of the waveform during the transmission of the wake-up radio packet comprises:
    at each antenna of the plurality of antennas, applying a different phase rotation pattern to the respective waveform corresponding to the respective antenna by:
        at each tone of a plurality of tones in a frequency domain, multiplying a respective spatial mapping vector corresponding to the respective tone with content loaded on the respective tone; and
        adding respective results corresponding to a set of center tones of the plurality of tones to obtain a transmitted signal vector.

3. The method of claim 2, wherein each element of the respective spatial mapping vector is calculated based on a cyclic shift diversity value corresponding to a respective antenna.

4. The method of claim 2, wherein each element of the respective spatial mapping vector is calculated based on a random phase variable for each antenna on the respective tone, and wherein the random phase variable is generated according to a probability distribution.

5. The method of claim 1, wherein the adjusting, by each of the plurality of antennas, the waveform with spatial mapping to prevent unintentional spatial nulling of the waveform during the transmission of the wake-up radio packet comprises:
    at each antenna of the plurality of antennas, applying a different frequency shift to the respective waveform corresponding to the respective antenna by:
        summing content loaded at each tone of a plurality of tones in a frequency domain for a set of center tones of the plurality of tones; and
        multiplying a spatial mapping vector with summed contents to obtain a transmitted signal vector.

6. The method of claim 5, wherein each element of the spatial mapping vector is configured based on a fixed frequency shift variable.

7. The method of claim 5, wherein each element of the spatial mapping vector is configured based on a random frequency shift variable, and wherein the random frequency shift variable is generated following a probability distribution.

8. The method of claim 1, wherein the adjusting, by each of the plurality of antennas, the waveform with spatial mapping to prevent unintentional spatial nulling of the waveform during the transmission of the wake-up radio packet comprises:
    generating a transmitted signal vector by summing content vectors corresponding to a set of center tones of a plurality of tones in a frequency domain.

9. The method of claim 8, wherein, for each content vector, at least one of content loaded to each antenna of the plurality of antennas and interleaving or scrambling pattern used for each antenna of the plurality of antennas is different per each antenna.

10. The method of claim 1, wherein the adjusting, by each of the plurality of antennas, the waveform with spatial mapping to prevent unintentional spatial nulling of the waveform during the transmission of the wake-up radio packet comprises:
    at each antenna of the plurality of antennas, applying a cyclic shift diversity value to the waveform,
        wherein the cyclic shift diversity value is determined based on a pre-defined cyclic shift diversity value defined in 802.11ac standard.

11. A network device for transmitting a wake-up radio packet to low power devices in a wireless local area network, the network device comprising:
    processing circuitry configured to:
        receive data for transmission to one or more lower power wireless devices;
        configure a wake-up radio packet including a wake-up data frame for transmission to the one or more lower power wireless devices; and
        generate a waveform for transmitting the wake-up radio packet; and
    a plurality of antennas configured to:
        adjust, at each of the plurality of antennas, the waveform with spatial mapping to prevent unintentional spatial nulling of the waveform during transmission of the wake-up radio packet; and transmit the wake-up radio packet in a form of the adjusted waveform to the one or more lower power wireless devices prior to transmitting the received data to the one or more lower power wireless devices.

12. The network device of claim 11, wherein the plurality of antennas, when adjusting the waveform with spatial mapping to prevent unintentional spatial nulling of the waveform during the transmission of the wake-up radio packet, is configured to:

at each antenna of the plurality of antennas, apply a different phase rotation pattern to the respective waveform by:

at each tone of a plurality of tones in a frequency domain, multiplying a respective spatial mapping vector corresponding to the respective tone with content loaded on the respective tone; and adding respective results from a set of center tones of the plurality of tones to obtain a transmitted signal vector.

13. The network device of claim 12, wherein the processing circuitry is further configured to calculate each element of the respective spatial mapping vector based on a cyclic shift diversity value corresponding to a respective antenna.

14. The network device of claim 12, wherein the processing circuitry is further configured to:

calculate each element of the respective spatial mapping vector based on a random phase variable for each antenna on the respective tone, and generate the random phase variable according to a probability distribution.

15. The network device of claim 11, wherein the plurality of antennas, when adjusting the waveform with spatial mapping to prevent unintentional spatial nulling of the waveform during the transmission of the wake-up radio packet, is configured to:

at each antenna of the plurality of antennas, apply a different frequency shift to the respective waveform corresponding to the respective antenna by:

summing content loaded at each tone of a plurality of tones in a frequency domain for a set of center tones of the plurality of tones; and multiplying a spatial mapping vector with summed contents to obtain a transmitted signal vector.

16. The network device of claim 15, wherein the control circuitry is further configured to configure each element of the spatial mapping vector based on a fixed frequency shift variable.

17. The network device of claim 15, wherein the control circuitry is further configured to:

configure each element of the spatial mapping vector based on a random frequency shift variable, and generate the random frequency shift variable following a probability distribution.

18. The network device of claim 11, wherein the plurality of antennas, when adjusting the waveform with spatial mapping to prevent unintentional spatial nulling of the waveform during the transmission of the wake-up radio packet, is configured to generate a transmitted signal vector by summing content vectors to a set of center tones of a plurality of tones in a frequency domain.

19. The network device of claim 18, wherein, for each content vector, at least one of content loaded to each antenna of the plurality of antennas and interleaving or scrambling pattern used for each antenna of the plurality of antennas is different per each antenna.

20. The network device of claim 11, wherein the plurality of antennas, when adjusting the waveform with spatial mapping to prevent unintentional spatial nulling of the waveform during the transmission of the wake-up radio packet, is configured to:

at each antenna of the plurality of antennas, apply a cyclic shift diversity value to the waveform; and determine the cyclic shift diversity value based on a pre-defined cyclic shift diversity value defined in 802.11ac standard.

* * * * *